United States Patent
Yamanaka (10) Patent No.: US 12,457,065 B2
(45) Date of Patent: Oct. 28, 2025

(54) ANOMALY DETECTION DEVICE, ANOMALY DETECTION METHOD, AND ANOMALY DETECTION PROGRAM

(71) Applicant: NTT, INC., Tokyo (JP)

(72) Inventor: Yuki Yamanaka, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/716,699

(22) PCT Filed: Dec. 15, 2021

(86) PCT No.: PCT/JP2021/046371
§ 371 (c)(1),
(2) Date: Jun. 5, 2024

(87) PCT Pub. No.: WO2023/112227
PCT Pub. Date: Jun. 22, 2023

(65) Prior Publication Data
US 2025/0038899 A1 Jan. 30, 2025

(51) Int. Cl.
*H04L 1/24* (2006.01)
*H04L 43/16* (2022.01)

(52) U.S. Cl.
CPC ............... *H04L 1/24* (2013.01); *H04L 43/16* (2013.01)

(58) Field of Classification Search
CPC . H04L 1/24; H04L 1/248; H04L 1/241; H04L 1/242; H04L 1/245; H04L 1/244; H04L 1/243; H04L 1/246; H04L 1/247; H04L 43/16; H04L 43/50; H04L 43/55; H04L 43/00; H04L 43/08; H04L 43/0823; H04L 43/0847; H04L 43/12
See application file for complete search history.

(56) References Cited

U.S. PATENT DOCUMENTS

| 2022/0182434 A1* | 6/2022 | Walters | H04N 21/64784 |
| 2023/0030341 A1* | 2/2023 | Koh | G06F 40/186 |
| 2024/0106766 A1* | 3/2024 | Wang | H04L 41/0806 |

OTHER PUBLICATIONS

Yamanaka et al., "Utilizing BERT for Feature Extraction of Packet Payload", The 35th Annual Conference of the Japanese Society for Artificial Intelligence, 1F2-GS-10a-04, 2021, pp. 1-3 (3 pages including English Abstract).

* cited by examiner

*Primary Examiner* — Khanh C Tran
(74) *Attorney, Agent, or Firm* — XSENSUS LLP (57) ABSTRACT

An abnormality detection device includes processing circuitry configured to input a normal packet to a Bidirectional Encoder Representations from Transformers (BERT) model learned using the normal packet, and acquire a size of Attention for each byte portion when encoding of the normal packet is performed, sample an important byte portion of the normal packet based on the size of the Attention of each byte portion of the normal packet acquired, and rewrite the sampled important byte portion to a random byte to generate a pseudo-abnormal packet, and determine a threshold value of an abnormality degree for detecting an abnormal packet based on the abnormality degree of the generated pseudo-abnormal packet group and normal packet group.

6 Claims, 6 Drawing Sheets

| | | COMPARATIVE EXAMPLE<br>THRESHOLD VALUE: −1094.592807 | | PRESENT EMBODIMENT<br>THRESHOLD VALUE: −1450 | |
|---|---|---|---|---|---|
| | | PREDICTION OF<br>MACHINE LEARNING MODEL | | PREDICTION OF<br>MACHINE LEARNING MODEL | |
| | | Positive | Negative | Positive | Negative |
| ACTUAL CLASS | Positive | 162 | 118 | 262 | 18 |
| | Negative | 9 | 271 | 29 | 251 |
| | Accuracy: | 0.773214286 | | 0.916071429 | |
| | Precision: | 0.947368421 | | 0.900343643 | |
| | Recall: | 0.578571429 | | 0.935714286 | |
| | F1: | 0.718403548 | | 0.917688266 | |

Fig. 6

ANOMALY DETECTION DEVICE, ANOMALY DETECTION METHOD, AND ANOMALY DETECTION PROGRAM

CROSS-REFERENCE TO RELATED APPLICATION

This application is a national stage application, pursuant to 35 U.S.C. § 371, of International Patent Application No. PCT/JP2021/046371, filed Dec. 15, 2021, the entire contents of which are incorporated herein by reference.

TECHNICAL FIELD

The present invention relates to an abnormality detection device, an abnormality detection method, and an abnormality detection program.

BACKGROUND ART

Conventionally, attention has been focused on communication in abnormality detection systems and intrusion detection systems used in network control systems of industrial and building systems. In control system communication, for example, even a single order of magnitude change in set temperature value may lead to a serious accident. Therefore, it is necessary to detect illegal rewriting of 1 byte of communication contents (payload) without omission. Therefore, in an abnormality detection system for industrial and building network control systems, detailed analysis of payload contents is indispensable.

As a technique for performing such an analysis, for example, a technique for extracting information from a payload of an arbitrary protocol and detecting abnormality by applying a natural language processing technique such as Bidirectional Encoder Representations from Transformers (BERT) to packet analysis is known.

CITATION LIST

Non Patent Literature

[NPL 1] Yuuki Yamanaka et al., Utilizing BERT for Feature Extraction of Packet Payload, Annual Conference of the Japanese Society for Artificial Intelligence, 2021 (35th)

SUMMARY OF INVENTION

Technical Problem

However, NPL 1 above does not refer to how to set the threshold value for the abnormality degree for issuing an alert for abnormality detection. In general, the threshold value should be adjusted to a value which divides the abnormality degree of the data by preparing both normal data and abnormal data, but it is difficult to prepare actual cyber attack data (abnormal data). For this reason, for example, a method has been taken in which a value obtained by adding a predetermined value to an average value of abnormality degrees of normal data is used as a threshold value. The threshold value obtained by this method is not necessarily a value that adequately separates the degree of anomaly between normal and abnormal data. As a result, there is a problem that the abnormality detection system cannot accurately detect an abnormal packet.

Accordingly, an object of the present invention is to set an appropriate threshold value for detecting an abnormal packet.

Solution to Problem

In order to solve the above problem, invention an abnormality detection device includes processing circuitry configured to input a normal packet to a Bidirectional Encoder Representations from Transformers (BERT) model learned using the normal packet, and acquire a size of Attention for each byte portion when encoding of the normal packet is performed, sample an important byte portion of the normal packet based on the size of the Attention of each byte portion of the normal packet acquired, and rewrite the sampled important byte portion to a random byte to generate a pseudo-abnormal packet, and determine a threshold value of an abnormality degree for detecting an abnormal packet based on the abnormality degree of the generated pseudo-abnormal packet group and normal packet group.

Advantageous Effects of Invention

According to the present invention, an appropriate threshold value for detecting an abnormal packet can be set.

DESCRIPTION OF EMBODIMENTS

Hereinafter, modes (embodiments) for carrying out the present invention will be described with reference to the accompanying drawings. The present invention is not limited to the present embodiment.

[Attention Mechanism of BERT] First, an Attention mechanism of BERT used by an abnormality detection device of the present embodiment for determining a threshold value of an abnormality degree of a packet will be briefly described. The Attention mechanism used in the BERT or the like imparts a weight to each token (for example, a word in the case of a sentence or a byte in the case of a packet). If the Attention works strongly, the BERT converts the token into a vector of a fixed length by placing importance on the token on which the Attention works strongly.

The Attention mechanism is optimized to impart a large weight to an important token through learning of Masked Language Modeling and Next Sentence Prediction, which are Pre-training task of the BERT.

Figure 1:
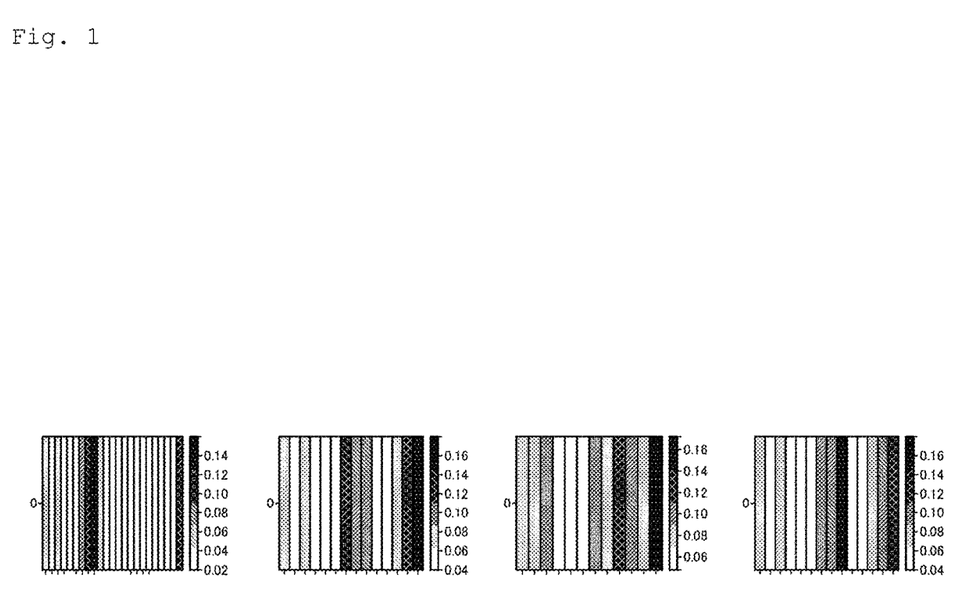
FIG. 1 is a diagram illustrating an example of strength of Attention for each byte portion of a packet.

FIG. 1 is a diagram illustrating an example of strength of Attention for each byte portion of a packet input to a BERT model. In FIG. 1, the hatching density indicates the strength of the Attention. As illustrated in FIG. 1, byte portions having a high likelihood of being important in the packet such as a function code and a data portion of the packet are strongly subjected to the Attention.

Figure 2:
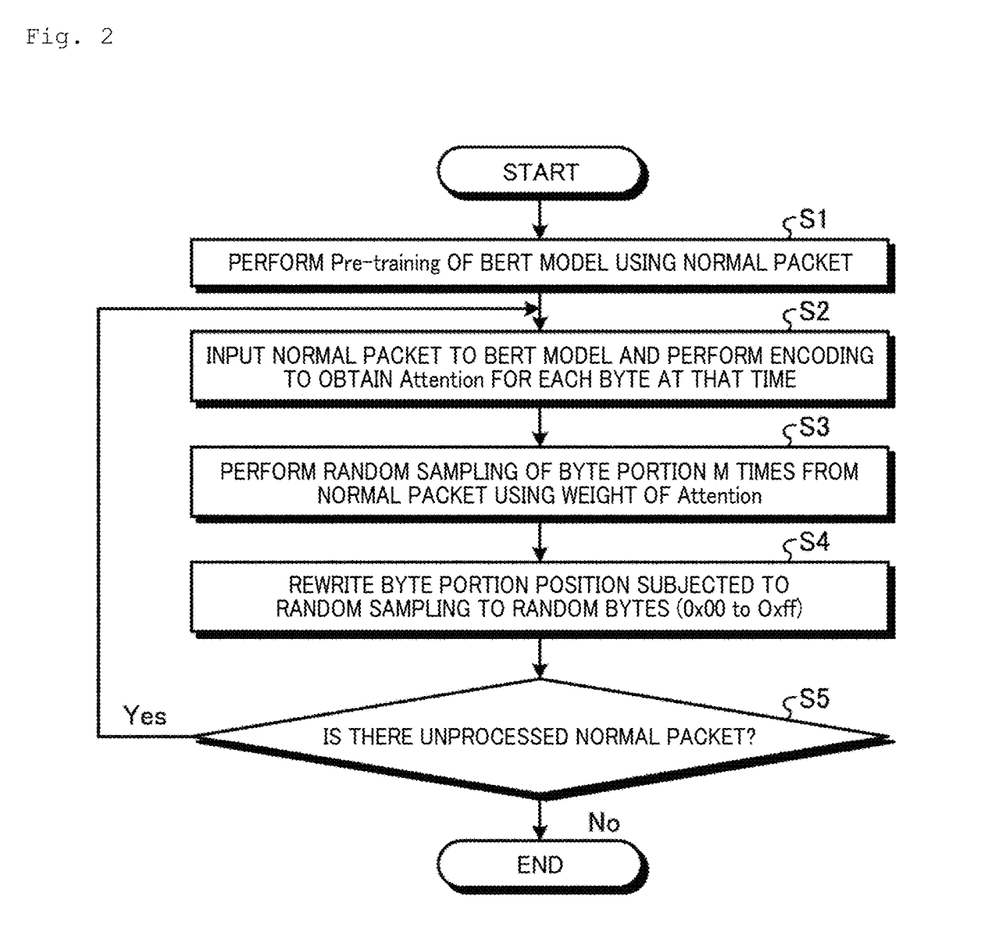
FIG. 2 is a flowchart illustrating an example of a procedure for generating a pseudo-abnormal packet.

[Outline] The abnormality detection device generates a pseudo-abnormal packet with high quality by preferentially rewriting a byte portion (=a byte portion having a high possibility of being important) where Attention is strongly giving in a normal packet using the Attention mechanism described above. FIG. 2 illustrates an example of a generation procedure of pseudo-abnormal packets.

First, the abnormality detection device performs Pre-training of the BERT model using the collected normal packets (S1). Then, the abnormality detection device inputs the normal packet to the BERT model and performs encoding to obtain an Attention for each byte at that time (S2). Here, the Attention mechanism performs processing such as averaging in a Layer direction and a Head direction, for example, and obtains the Attention of a one-dimensional vector having the same dimension as the number of bytes of a normal packet input to the BERT model.

Next, the abnormality detection device performs weighted random sampling of byte portions M times from the normal packet using weight of the Attention obtained in S2 (S3). The abnormality detection device rewrites the byte portion subjected to random sampling in S3 to random bytes (for example, 0x00 to 0xff) (S4). That is, the abnormality detection device generates a pseudo-abnormal packet by rewriting the important byte portion sampled from the normal packet.

After S4, if there is an unprocessed normal packet (Yes in S5), the processing returns to S2, and if there is no unprocessed normal packet (No in S5), the processing ends.

Thus, the abnormality detection device generates the number of normal packets multiplied by the number of M pseudo-abnormal packets. Then, the abnormality detection device determines a threshold value of an abnormality degree for detecting abnormality of the packet using the generated pseudo-abnormal packet group and the normal packet group. A threshold value determination method is, for example, F1 optimization or the like.

Then, the abnormality detection device detects the abnormal packet by setting the threshold value determined in the above manner. For example, in a case where the abnormality degree of the packet to be detected exceeds the threshold value, the abnormality detection device detects the packet as an abnormal packet.

According to such an abnormality detection device, since an appropriate threshold value for detecting an abnormal packet can be set, the abnormal packet can be detected with high accuracy.

Figure 3:
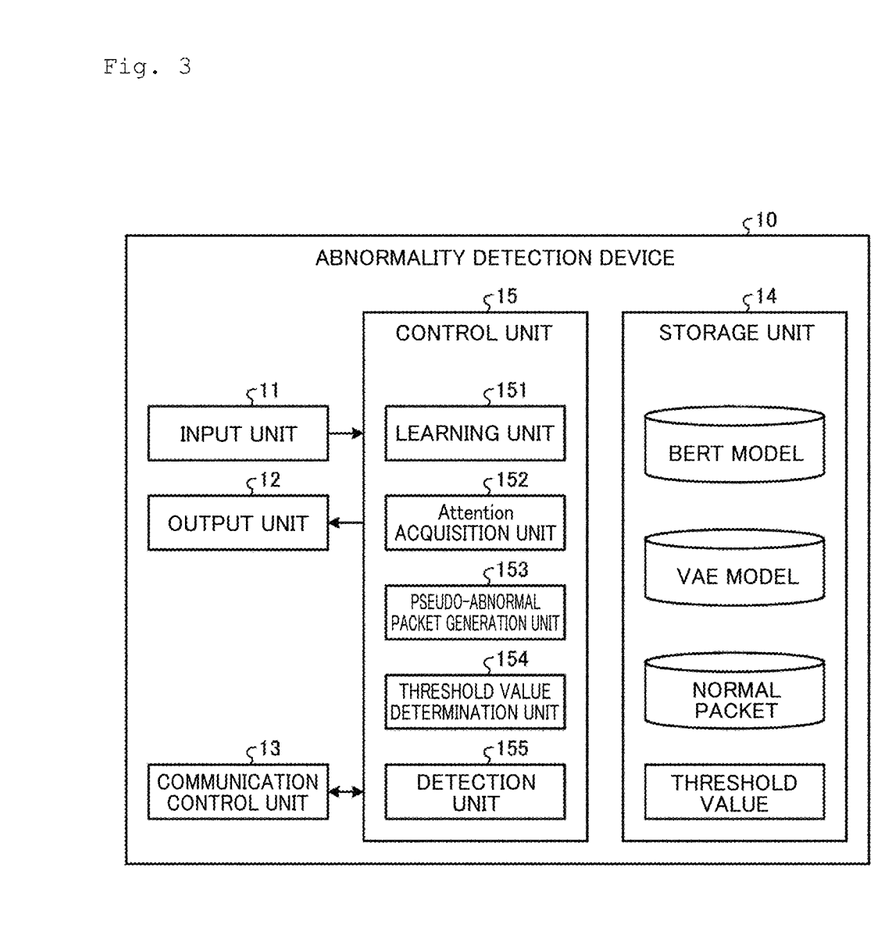
FIG. 3 is a diagram illustrating a configuration example of an abnormality detection device.

[Configuration Example] Next, an abnormality detection device 10 will be described with reference to FIG. 3. The abnormality detection device 10 is disposed in an appropriate unit, for example, for each network or apparatus to be detected. Then, the abnormality detection device 10 saves a BERT model, a VAE model, and a normal packet corresponding to the unit in a storage unit.

The abnormality detection device 10 is realized as a general-purpose computer such as a personal computer, for example, and includes an input unit 11, an output unit 12, a communication control unit 13, a storage unit 14, and a control unit 15.

The input unit 11 is, for example, an interface for receiving an input operation from an input device such as a keyboard or a mouse. The output unit 12 is, for example, an interface for outputting data to a display device such as a liquid crystal display, a printing device such as a printer, or the like.

The communication control unit 13 is implemented by, for example, a Network Interface Card (NIC), and controls communication between the control unit 15 and an external device via a telecommunication line such as a Local Area Network (LAN) or the Internet.

The storage unit 14 is realized using a semiconductor memory element such as a Random Access Memory (RAM) or a flash memory, or a storage device such as a hard disk or an optical disc. The storage unit 14 stores in advance, for example, a processing program that operates the abnormality detection device 10 and data to be used during execution of the processing program, or stores the processing program and the data temporarily every time the processing is executed.

The storage unit 14 stores, for example, a BERT model, a Variation Auto Encoder (VAE) model, a normal packet and the like learned by the control unit 15. In addition, when a threshold value for detecting an abnormal packet is determined by the control unit 15, the storage unit 14 stores the determined threshold value.

The BERT model is a model obtained by learning a rule for converting one packet into one fixed length vector. In other words, the BERT model is a model obtained by learning a frequent pattern such as the order of internal byte strings in a normal packet.

For example, the BERT model learns an intermediate representation that reflects packet features, that is, a fixed-length vector, by solving an auxiliary task of predicting a byte at a certain position in a packet from surrounding bytes. In addition, the BERT model also predicts a byte at a certain position in the packet from surrounding bytes to acquire a vector expression reflecting a feature of the packet.

The VAE model is a model for allocating an abnormality degree of a packet to a fixed length vector of the packet converted by the BERT model.

The control unit 15 is implemented using a Central Processing Unit (CPU) or the like, and executes a processing program stored in a memory. Thus, as illustrated in FIG. 3, the control unit 15 includes a learning unit 151, an Attention acquisition unit 152, a pseudo-abnormal packet generation unit 153, a threshold value determination unit 154, and a detection unit 155. Note that each or some of these function units may be mounted on a different piece of hardware.

The learning unit 151 learns (generates, updates) the BERT model and the VAE model using the normal packet. For example, the learning unit 151 learns the BERT model by solving two tasks of Masked Language Modeling and Next Sentence Prediction using the normal packet.

The Masked Language Modeling in the present embodiment is a task for randomly masking bytes of a normal packet and allocating bytes before being masked. In addition, Next Sentence Prediction is a task for inputting two packets and determining whether these packets are continuous packets or not.

The Attention acquisition unit 152 inputs a normal packet to the learned BERT model, and acquires the size of Attention for each byte portion when encoding of the normal packet is performed.

The pseudo-abnormal packet generation unit 153 generates a pseudo-abnormal packet from the normal packet. For example, the pseudo-abnormal packet generation unit 153 samples (for example, random sampling) an important byte portion of a normal packet based on the size of the Attention of each byte portion of the normal packet acquired by the Attention acquisition unit 152. Then, the pseudo-abnormal packet generation unit 153 rewrites the sampled random byte (for example, the byte of 0x00 to 0xff) at the important byte portion. Then, a pseudo-abnormal packet generation unit 153 sets a packet in which the important byte portion of the normal packet is rewritten as a pseudo-abnormal packet.

In a case where it is preferable that the number of pseudo-abnormal packets used for determining the threshold value be equal to the number of normal packets, the pseudo-abnormal packet generation unit 153 adjusts the sampling number so that the number of pseudo-abnormal packets to be generated becomes the same number as the number of normal packets.

The threshold value determination unit 154 determines a threshold value of an abnormality degree for detecting a packet as an abnormal packet using the normal packet and the pseudo-abnormal packet generated by the pseudo-abnormal packet generation unit 153.

For example, the threshold value determination unit 154 calculates the abnormality degree of the normal packet and the pseudo-abnormal packet based on the BERT model and the VAE model described above. Next, the threshold value determination unit 154 determines a threshold value of the abnormality degree by applying F1 optimization or the like to the calculated abnormality degree of the normal packet and the pseudo-abnormal packet. Thereafter, the threshold value determination unit 154 stores the threshold value of the determined abnormality degree in the storage unit 14.

The detection unit 155 detects an abnormal packet using the threshold value determined by the threshold value determination unit 154. For example, when receiving an input of a packet to be detected, the detection unit 155 converts the packet into a fixed length vector reflecting a feature of the packet by a BERT model. Next, the detection unit 155 allocates the abnormality degree to each fixed length vector by a VAE model. In a case where the abnormality degree allocated to the fixed length vector exceeds the threshold value, the detection unit 155 detects a packet corresponding to the fixed length vector as an abnormal packet. Thereafter, the detection unit 155 outputs a detection result of the abnormal packet.

Figure 4:
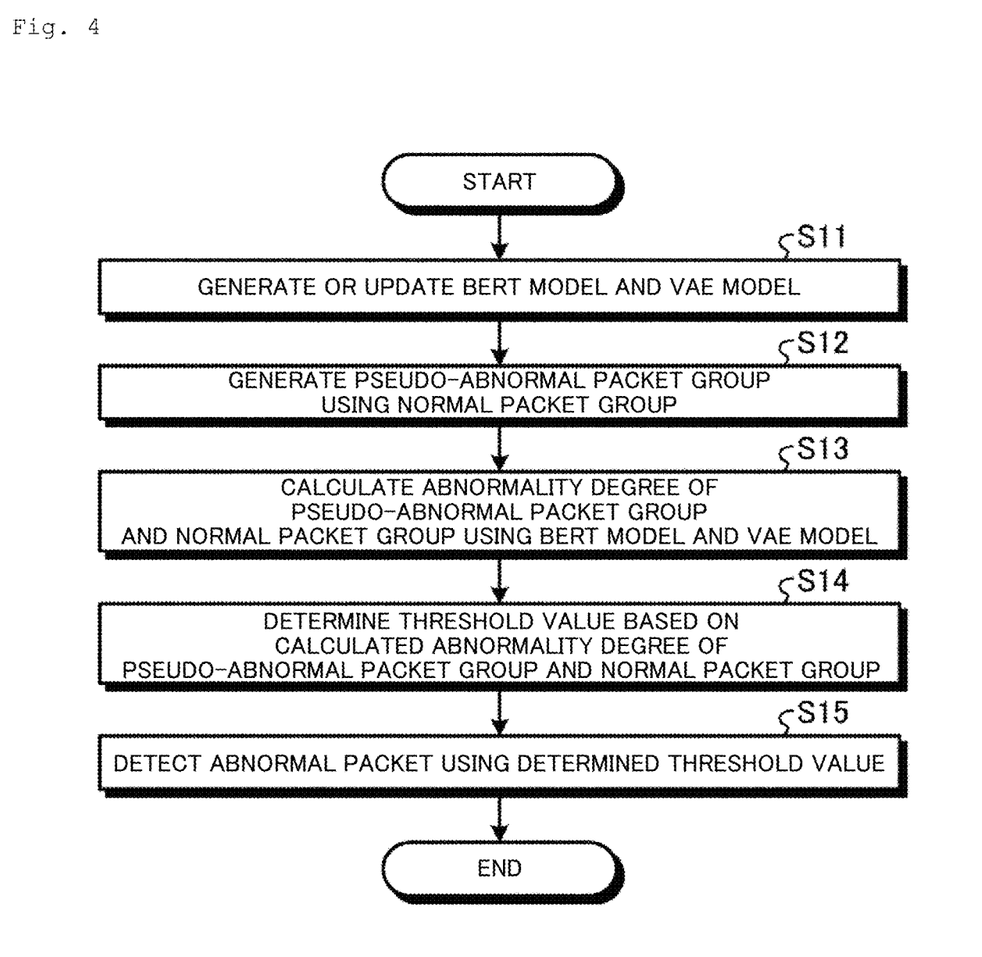
FIG. 4 is a flowchart illustrating an example of a processing procedure performed by the abnormality detection device.

[Example of Processing Procedure] Next, an example of a processing procedure of the abnormality detection device 10 will be described with reference to FIG. 4. First, the learning unit 151 of the abnormality detection device 10 generates or updates the BERT model and the VAE model using the normal packet (S11). Thereafter, the pseudo-abnormal packet generation unit 153 generates a pseudo-abnormal packet group using the normal packet group (S12).

After S12, the threshold value determination unit 154 calculates the abnormality degree of the pseudo-abnormal packet group and the normal packet group using the BERT model and the VAE model (S13). Then, the threshold value determination unit 154 determines a threshold value for detecting an abnormal packet based on the abnormality degree of the pseudo-abnormal packet group and the normal packet group calculated in S13 (S14). Thereafter, the detection unit 155 detects an abnormal packet using the threshold value determined in S14 (S15). Thereafter, the detection unit 155 outputs a detection result of the abnormal packet.

According to such an abnormality detection device 10, a pseudo-abnormal packet with high quality can be generated from the normal packet. Thus, the abnormality detection device 10 can set an appropriate threshold value for detecting the abnormal packet. As a result, the abnormality detection device 10 can accurately detect the abnormal packet.

[Comparison Result] Next, a comparison result between the case where the threshold value determined by the abnormality detection device 10 of the present embodiment is used for detecting an abnormal packet and the case where the threshold value (abnormality degree of the normal packet+3*standard deviation of the abnormality degree of the normal packet) determined by the prior art is used (comparative example) will be described with reference to FIG. 5.

The abnormality detection device 10 determines the threshold value by F1 optimization of the abnormality degree of the pseudo-abnormal packet and the normal packet. The machine learning model used for the evaluation is a model for predicting whether the class of the input packet is Positive (abnormal) or Negative (normal) using the BERT model and the VAE model.

Figure 5:
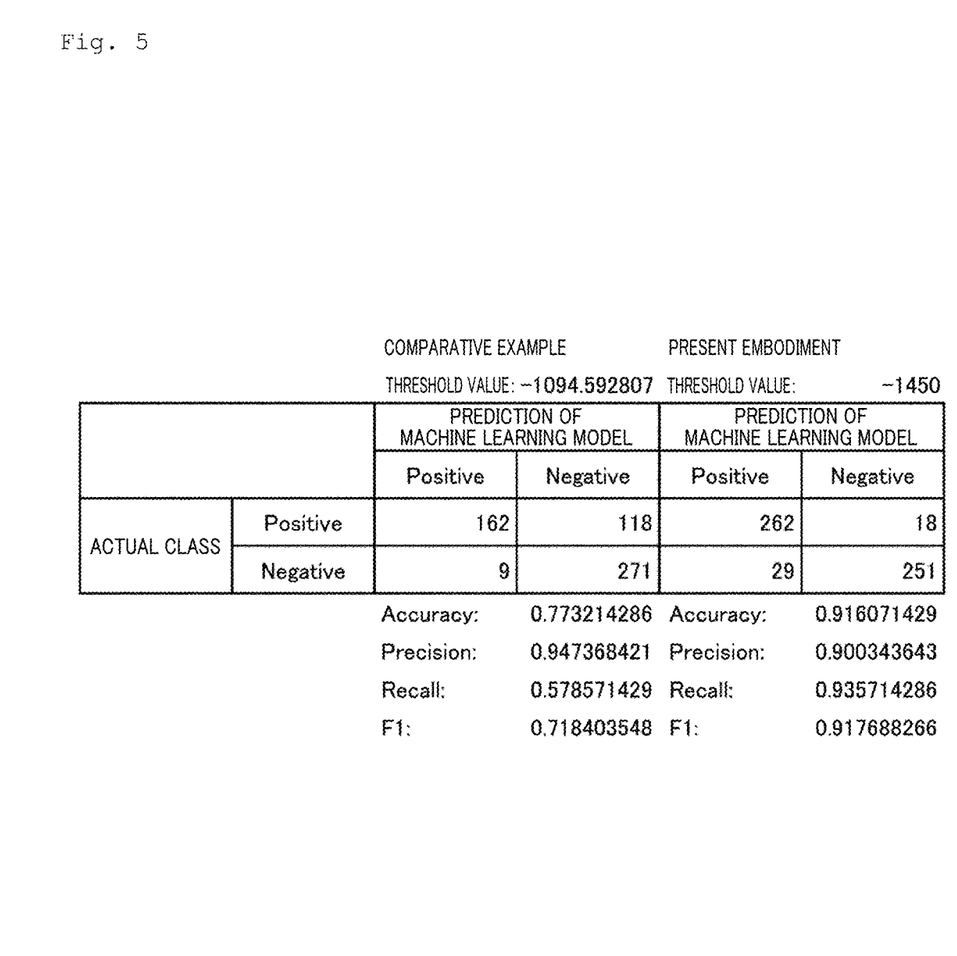
FIG. 5 is a diagram illustrating a comparison result between the threshold value determined by the prior art and the threshold value determined by the abnormality detection device.

As illustrated in FIG. 5, when a machine learning model predicts whether a class of the packet is Positive (abnormal) or Negative (normal), better values for Accuracy, Recall, and F value are obtained in a case where the threshold value determined by the abnormality detection device 10 is used than in a case where the threshold value determined by the prior art is used. Thus, it has been confirmed that the threshold value determined by the abnormality detection device 10 is a threshold value more suitable for detecting an abnormal packet than in the prior art.

[System Configuration, etc.] Also, each component of each unit illustrated in the figure is functionally conceptual, and does not necessarily need to be physically configured as illustrated in the figure. In other words, the specific forms of dispersion and integration of each apparatus are not limited to those illustrated in the drawings and all of or a part of the apparatus may be functionally or physically distributed or integrated in any unit depending on various loads, usage conditions, or the like. Further, all or some of respective processing functions performed by respective apparatuses can be realized by a CPU and a program executed by the CPU, or realized as hardware by wired logic.

Also, out of the steps of processing described in the foregoing embodiment, all or some of the steps of processing described as being automatically executed may also be manually executed. Alternatively, all or some of the steps of processing described as being manually executed may also be automatically executed using a known method. In addition, the processing procedure, the control procedure, specific names, information including various types of data and parameters that are illustrated in the above document and drawings may be arbitrarily changed unless otherwise described.

[Program] The abnormality detection device 10 described above can be implemented by installing a program (abnormality detection program) as package software or online software in a desired computer. For example, it is possible to cause an information processing device to function as the abnormality detection device 10 by causing the information processing device to execute the program described above. The information processing apparatus referred to here includes a mobile communication terminal such as a smart phone, a mobile phone, and a personal handyphone system (PHS), or a terminal such as a personal digital assistant (PDA).

Figure 6:
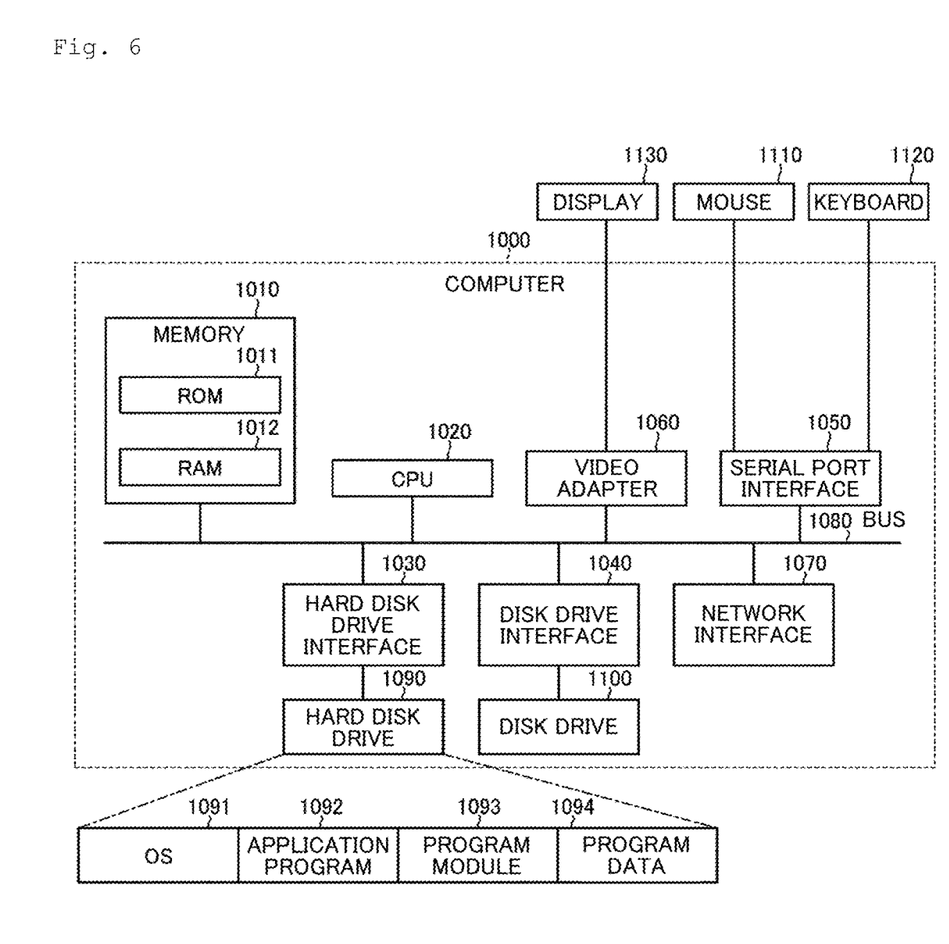
FIG. 6 is a diagram for illustrating a configuration example of a computer that executes an abnormality detection program.

FIG. 6 is a diagram for illustrating an example of a computer which executes an abnormality detection program. A computer 1000 includes, e.g., a memory 1010 and a CPU 1020. Further, the computer 1000 also includes a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. More specifically, the program defining each kind of processing executed by the abnormality detection device 10 is implemented as the program module 1093 in which a code executable by the computer is described. The program module 1093 is stored in, e.g., the hard disk drive 1090. The program module 1093 for executing processing the same as the functional configurations of the abnormality detection device 10, for example, is stored in the hard disk drive 1090. Note that the hard disk drive 1090 may be replaced with a solid state drive (SSD).

Data used in the processing of the above-described embodiments is stored as the program data 1094 in the memory 1010 or the hard disk drive 1090, for example. The CPU 1020 reads the program module 1093 or the program data 1094 stored in the memory 1010 or the hard disk drive 1090 to the RAM 1012 and executes the program data, as necessary.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (a local area network (LAN), a wide area network (WAN), or the like). The program module 1093 and the program data 1094 may be read by CPU 1020 through the network interface 1070 from the other computer.

REFERENCE SIGNS LIST

10 Abnormality detection device
11 Input unit
12 Output unit
13 Communication control unit
14 Storage unit
15 Control unit
151 Learning unit
152 Attention acquisition unit
153 Pseudo-abnormal packet generation unit
154 Threshold value determination unit
155 Detection unit

The invention claimed is:

1. An abnormality detection device comprising:
processing circuitry configured to:
input a normal packet to a Bidirectional Encoder Representations from Transformers (BERT) model learned using the normal packet, and acquire a size of Attention for each byte portion when encoding of the normal packet is performed;
sample an important byte portion of the normal packet based on the size of the Attention of each byte portion of the normal packet acquired, and rewrite the sampled important byte portion to a random byte to generate a pseudo-abnormal packet; and
determine a threshold value of an abnormality degree for detecting an abnormal packet based on the abnormality degree of the generated pseudo-abnormal packet group and normal packet group.

2. The abnormality detection device according to claim 1, wherein the processing circuitry is further configured to determine the threshold value of the abnormality degree by an F1 optimization method.

3. The abnormality detection device according to claim 1, wherein the processing circuitry is further configured to detect a packet as an abnormal packet in a case where the abnormality degree of the packet to be detected exceeds the threshold value.

4. The abnormality detection device according to claim 1, wherein the processing circuitry is further configured to generate the pseudo-abnormal packet by randomly sampling an important byte portion of the normal packet based on the size of the Attention of each byte portion of the acquired normal packet, and rewriting the randomly sampled important byte portion to a random byte.

5. An abnormality detection method executed by an abnormality detection device, the abnormality detection method comprising:
inputting a normal packet to a Bidirectional Encoder Representations from Transformers (BERT) model learned using the normal packet, and acquiring a size of Attention for each byte portion when encoding of the normal packet is performed;
sampling an important byte portion of the normal packet based on the size of the Attention of each byte portion of the normal packet acquired, and rewriting the sampled important byte portion to a random byte to generate a pseudo-abnormal packet; and
determining a threshold value of an abnormality degree for detecting an abnormal packet based on the abnormality degree of the generated pseudo-abnormal packet group and normal packet group.

6. A non-transitory computer-readable recording medium storing therein an abnormality detection program that causes a computer to execute a process comprising:
inputting a normal packet to a Bidirectional Encoder Representations from Transformers (BERT) model learned using the normal packet, and acquiring a size of Attention for each byte portion when encoding of the normal packet is performed;
sampling an important byte portion of the normal packet based on the size of the Attention of each byte portion of the normal packet acquired, and rewriting the sampled important byte portion to a random byte to generate a pseudo-abnormal packet; and
determining a threshold value of an abnormality degree for detecting an abnormal packet based on the abnormality degree of the generated pseudo-abnormal packet group and normal packet group.

* * * * *